US006941837B2

(12) United States Patent
Rummel

(10) Patent No.: US 6,941,837 B2
(45) Date of Patent: Sep. 13, 2005

(54) BILATERAL CONNECTING ROD APPARATUS

(75) Inventor: Chad Rummel, Farmington Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 192 days.

(21) Appl. No.: 10/368,271

(22) Filed: Feb. 18, 2003

(65) Prior Publication Data

US 2004/0159177 A1 Aug. 19, 2004

(51) Int. Cl.[7] .......................... B23P 15/00; B23P 17/00

(52) U.S. Cl. ................ 74/579 E; 74/579 R; 29/888.01; 29/888.09; 123/51 BB; 123/54.1; 123/51 B; 123/43 R

(58) Field of Search .................. 29/888.01; 123/51 BB, 123/54.1, 51 B, 43 R, 888.09; 74/52, 579 R, 579 E

(56) References Cited

U.S. PATENT DOCUMENTS 3,730,148 A * 5/1973 Bagby ...................... 123/43 R
4,079,705 A * 3/1978 Buchner .................. 123/51 B
4,237,741 A * 12/1980 Huf et al. ...................... 74/52
5,119,770 A * 6/1992 Graham et al. ............ 123/54.1
5,549,034 A 8/1996 Loughlin
5,594,187 A 1/1997 Lynn
5,613,182 A 3/1997 Lynn
5,661,904 A 9/1997 Loughlin
5,758,611 A * 6/1998 Collins .................. 123/51 BB
5,987,747 A * 11/1999 Pong ...................... 29/888.01

* cited by examiner

*Primary Examiner*—Vinh T. Luong
(74) *Attorney, Agent, or Firm*—Thomas A. Jurecko

(57) ABSTRACT

An apparatus and method provide a true bilateral connecting rod apparatus having a crankshaft defining an axis of rotation and a rod journal eccentrically mounted for circular rotation about the axis, and a pair of connecting rods attached to the rod journal for reciprocating motion in a common plane extending perpendicularly through the rod journal. One or more retaining rings engage the pair of connecting rods and secure the pair of connecting rods to the journal. A common bearing insert is disposed between the pair of connecting rods and the rod journal.

6 Claims, 4 Drawing Sheets

FIG. 3
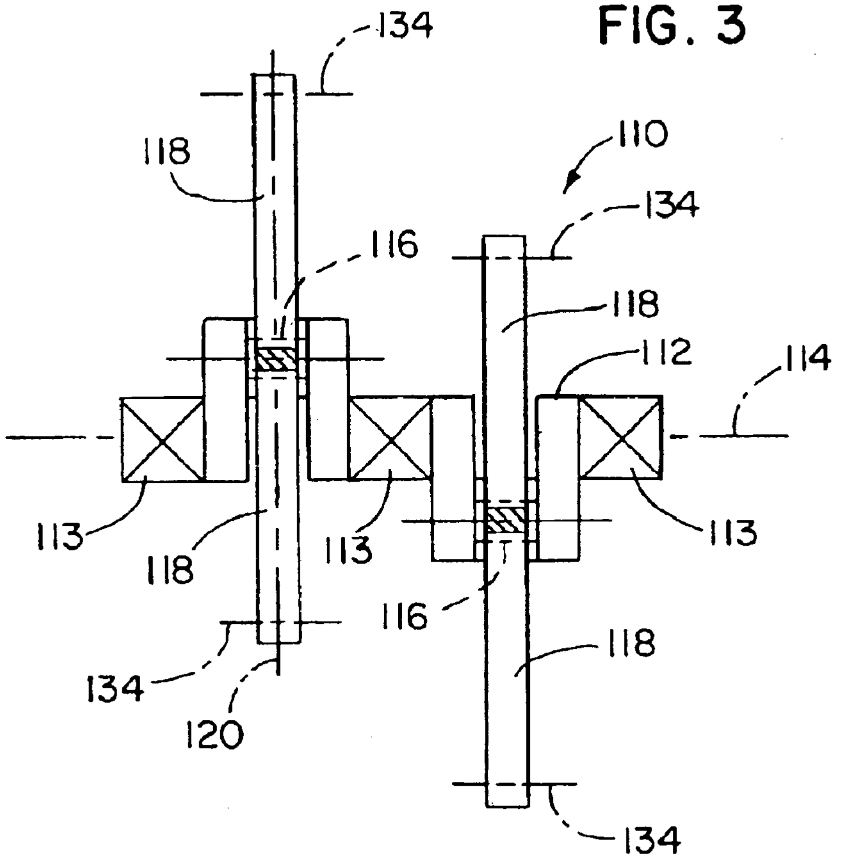
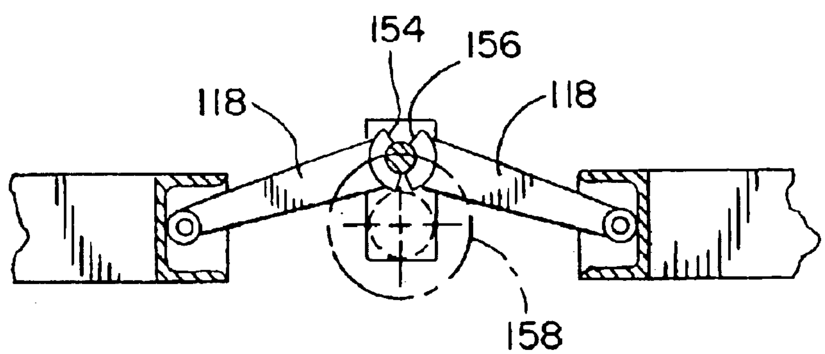
FIG. 6

BILATERAL CONNECTING ROD APPARATUS

TECHNICAL FIELD OF THE INVENTION

This invention relates to reciprocating mechanisms having a crankshaft including an eccentrically oriented rod journal connected to a connecting rod, and more particularly to mechanisms requiring a bilateral connecting rod apparatus having a pair of connecting rods extending in substantially opposed directions from the crankshaft.

BACKGROUND OF THE INVENTION

It is desirable in certain reciprocating mechanisms, such as multiple cylinder internal combustion engines or reciprocating compressors, to utilize two or more pistons reciprocating in cylinders oriented in a substantially bilaterally opposed relationship to one another on either side of a crankshaft. Such an arrangement results in a compact, flat mechanism that is well suited for mounting under the floor of a vehicle, for example.

In prior opposed piston mechanisms, however, it has not been possible to have the cylinders be truly opposed to one another due to limitations in the manner in which connecting rods used for imparting reciprocating motion to the pistons are constructed.

As shown in FIG. 1, the connecting rod apparatus 10 for a typical opposed piston mechanism includes a crankshaft 12 defining an axis of rotation 14 and one or more rod journals 16 eccentrically mounted for circular rotation about the axis 14. A pair of connecting rods 18 are attached at one end to each rod journal 16, and extend in opposite directions from the crankshaft 12, for imparting reciprocating motion, through a piston pin connection 20 at the outer end of the connecting rods 18.

As shown in FIG. 2, the connecting rods 18 include a shank 22 extending between the piston pin connection 20 and a connecting rod eye portion 24. The connecting rod eye portion 24 is formed by a bearing saddle 26 attached integrally to the shank 22, and a bearing cap 28 that is bolted to the bearing saddle 26 so that the cap 28 can be removed for attaching the connecting rod 18 to the rod journal 16. The bearing saddle 26 and bearing cap 28 each include a semi-circular cylindrical surface 30 for receiving half of an insert bearing 32 disposed between the connecting rod 18 and the rod journal 16.

As shown in FIG. 1, when the connecting rods 18 are attached to the rod journal 16, they must be attached one behind the other on the rod journal 16, so that they can articulate with respect to one another on the rod journal 16 as the rod journal 16 travels in its circular path, because the connecting rod eye portion 24 extends completely around the rod journal 16. As a result, each member of the pair of connecting rods 18 attached to the same journal 16 reciprocates in a separate plane 34, 36 extending perpendicularly through the rod journal 16, and separated by an axial distance 38 from one another.

The necessity for having the axial distance 38 between the connecting rods 18 causes the connecting rod apparatus 10 to be longer than it could be if the connecting rods 18 could be attached to the rod journal 16 in a manner that would allow them to reciprocate bi-laterally in a common plane extending perpendicularly through the rod journal 16. This additional length is undesirable for a number of reasons, including making the apparatus 10 less compact and heavier than it would otherwise need to be. Also, having the connecting rods 18 introduces undesirable dynamic forces into the apparatus 10 that require the addition of extra counter weights on the crankshaft 12, and complex mounting devices to damp out vibrations resulting from the undesirable dynamic forces.

What is needed, therefore, is an improved connecting rod apparatus having connecting rods capable of bi-lateral reciprocating motion in a common plane extending perpendicularly through a rod journal on a crankshaft.

SUMMARY OF THE INVENTION

The invention provides a true bilateral connecting rod apparatus, having a crankshaft defining an axis of rotation and a rod journal eccentrically mounted for circular rotation about the axis, and a pair of connecting rods attached to the rod journal for reciprocating motion in a common plane extending perpendicularly through the rod journal. Having the connecting rods reciprocate in a common plane allows the length of the connecting rod apparatus to be reduced, thereby providing a number of advantages including reduced weight and size, and reductions in undesirable dynamic forces and vibration.

The apparatus may include one or more retaining rings for engaging the pair of connecting rods and securing the pair of connecting rods to the journal. The apparatus may include a common bearing insert disposed between the pair of connecting rods and the rod journal. The common bearing may further be disposed between the retaining ring(s) and the rod journal. The retaining ring(s) may also form an axial thrust bearing between the connecting rods and the crankshaft for positioning the connecting rods on the rod journal.

In one form of the invention, a connecting rod includes a shank portion defining a longitudinal midplane of the connecting rod and a bearing saddle, with the bearing saddle having a cylindrical surface for engaging the rod journal. The cylindrical surface is bisected by the longitudinal midplane and subtended by an angle of less than 180 degrees centered at a radius of the cylindrical surface along the longitudinal midplane.

The invention may also take the form of a method for constructing a bilateral connecting rod apparatus having a crankshaft defining an axis of rotation and a rod journal eccentrically mounted for circular rotation about the axis and a pair of connecting rods attached to the rod journal for reciprocating motion in a common plane extending perpendicularly through the rod journal, by attaching a pair of connecting rods to the rod journal for reciprocating motion in the common plane extending perpendicularly through the rod journal.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is schematic representation of an exemplary embodiment of bilateral connecting rod apparatus having the connecting rods reciprocating in a common plane, according to the invention;

FIG. 6 is an axially facing view of the exemplary connecting rod apparatus of FIGS. 3–5 inside one of the rod journals of the exemplary embodiment of FIGS. 3–5.

DETAILED DESCRIPTION

Figure 1:
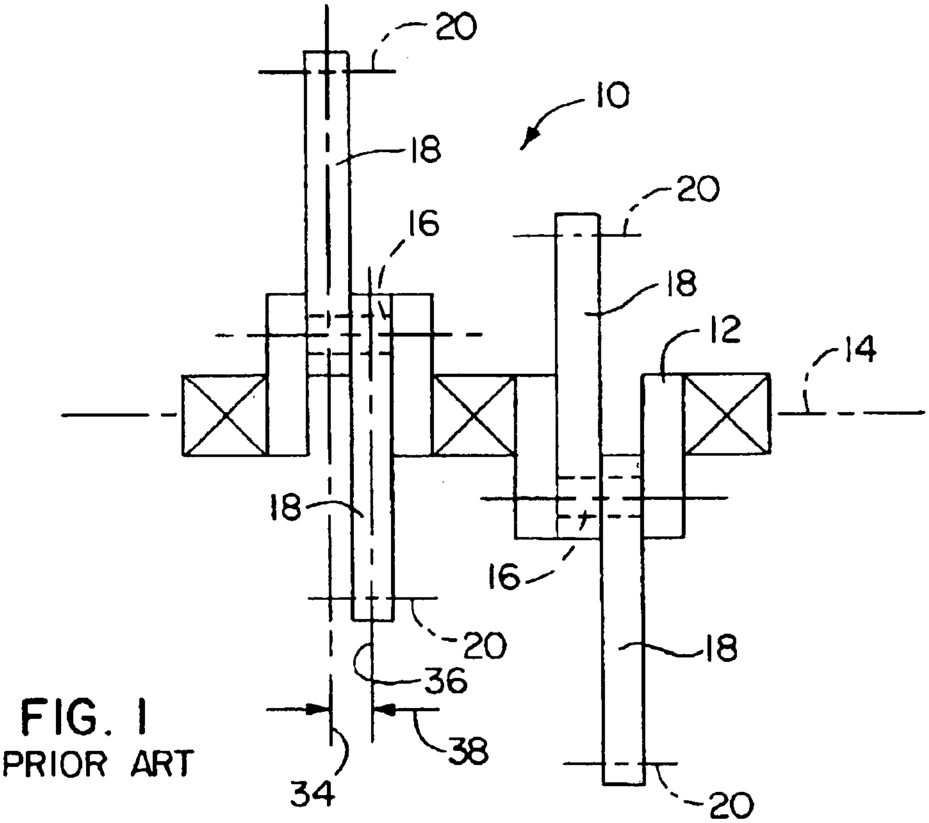
FIG. 1 is a schematic representation of a typical prior connecting rod apparatus having connecting rods on the same rod journal reciprocating in separate planes extending through the rod journal and separated from one another by an axial distance.
Figure 2:
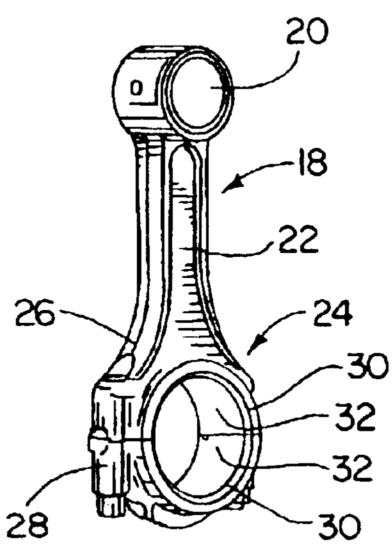
FIG. 2 is a perspective view of a connecting rod of the prior apparatus of FIG. 1, having an eye at one end thereof for attaching the connecting rod to a rod journal.

FIG. 3 depicts an exemplary embodiment of a bilateral connecting rod apparatus 110, according to the invention, including a crankshaft 112 supported on three main bearings 113 for rotation about axis of rotation 114. The crankshaft 112 includes two rod journals 116 eccentrically mounted for circular rotation about the axis of rotation 114. A pair of connecting rods 118 is attached to each of the rod journals 116 for reciprocating motion in a common plane 120 extending perpendicularly through the rod journal 116.

Figure 4A:
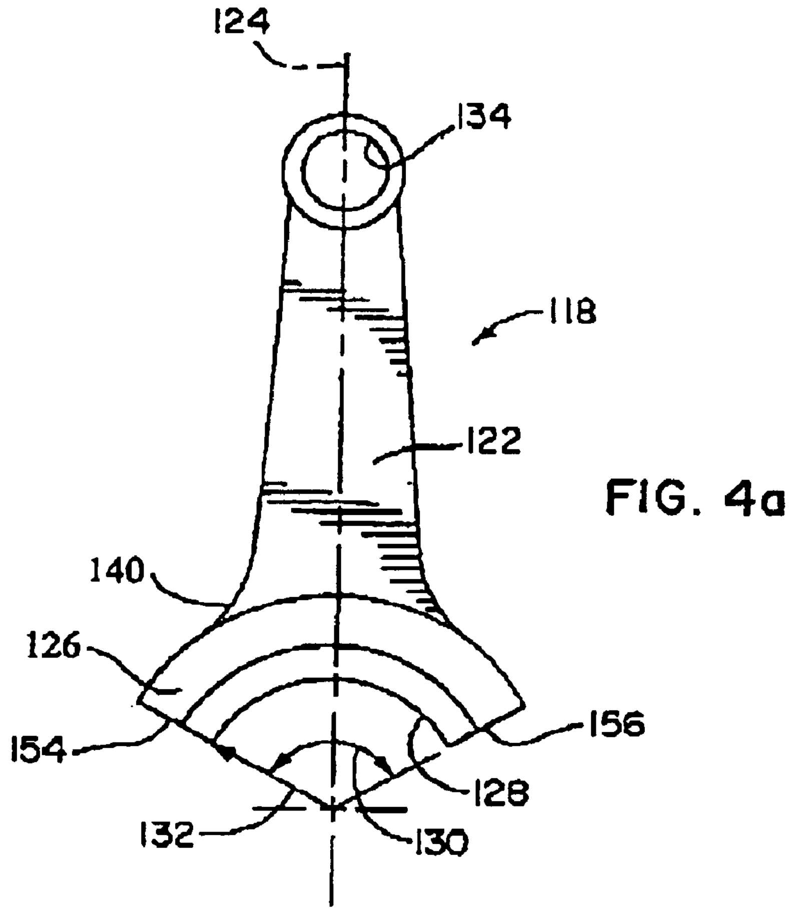
FIGS. 4*a* and 4*b* are front and side views of a connecting rod, according to the invention.
Figure 4B:
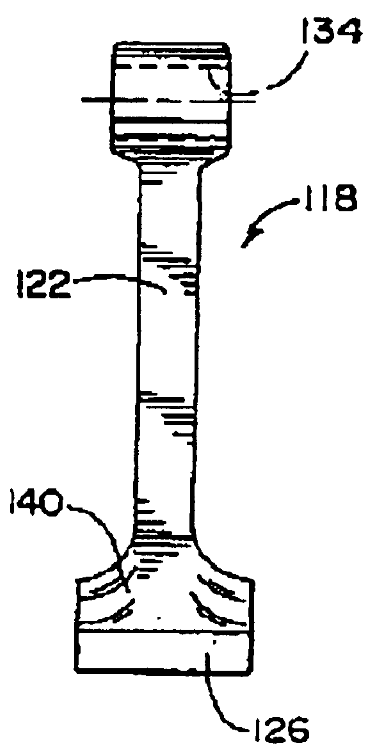

As shown in FIGS. 4*a* and 4*b*, each connecting rod 118 includes a shank portion 122 defining a longitudinal midplane 124 of the connecting rod 118 and a bearing saddle 126. The bearing saddle 126 has a cylindrical surface 128 bisected by the longitudinal midplane 124. The cylindrical surface 128 is subtended by an angle 130 of less than 180 degrees centered at a radius 132 of the cylindrical surface 128 along the longitudinal midplane 124 for engaging the rod journal 116. The opposite end of the connecting rod 118 includes an eye 134 for receiving a piston pin.

Figure 5:
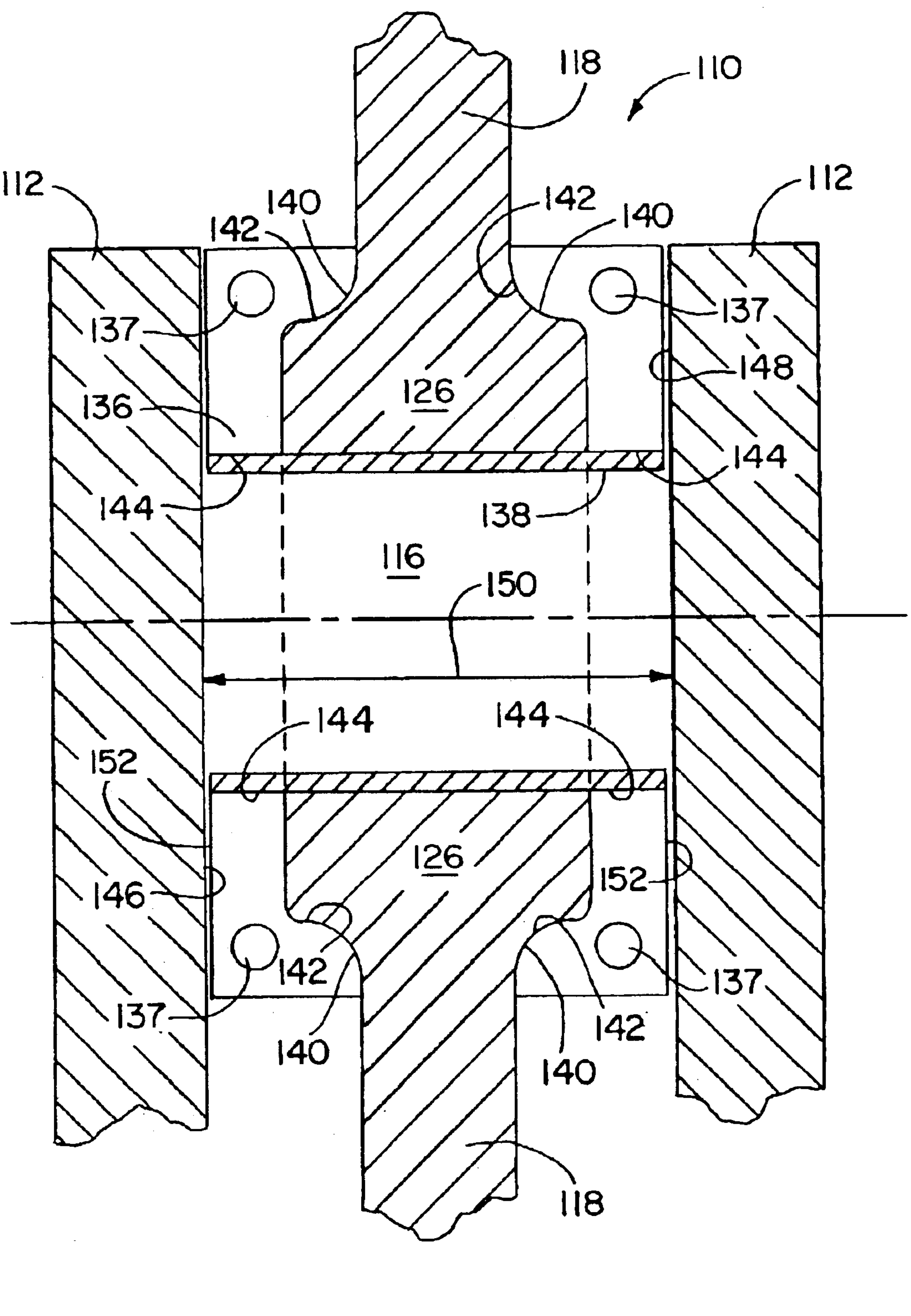
FIG. 5 is an enlarged view showing the manner in which the connecting rods of the exemplary embodiment of FIG. 3 are attached to the rod journal of a crankshaft.

As shown in FIG. 5, the apparatus 110 further includes a pair of retaining rings 136 for engaging each pair of connecting rods 118 and securing each pair of connecting rods 118 to one of the rod journals 116. As shown in FIGS. 4*a*, 4*b*, and 5, the retaining rings 136 engage the bearing saddles 126 of the connecting rods 118, and also engage the rod journal 116 through a bearing insert 138 that extends completely around each rod journal 116 between the rod journal 116 and the cylindrical surfaces 128 of the connecting rods 118 attached to that journal 116. In other embodiments of the invention, the bearing inserts 138 may not be necessary, if loads are light, or the connecting rods 118 and retaining rings 136 may include integrally formed bearing elements. The retaining rings 136 are split along a joining plane into two semicircular half rings, joined together by bolts (not shown) extending through holes 137, so that the halves of the retaining rings 136 may be separated for assembley of the connecting rod apparatus 110.

As shown in FIGS. 4*a*, 4*b*, and 5, each connecting rod 118 includes a pair of arcuate surfaces 140 extending parallel the cylindrical surface 128 of the bearing saddle 126, and each retaining ring 136 includes a first bearing surface 142 thereof configured for bearing against one of the arcuate surfaces 140 of the connecting rods 118. Each retaining ring 136 includes a second bearing surface 144 thereof configured for bearing against the rod journal 116 through the bearing insert 138. In the exemplary embodiment of the apparatus 10 shown in the drawings, the second bearing surface 144 of the retaining ring 136 extends 360 degrees around the rod journal 116, but in other embodiments it may be desirable to have the second bearing surface 144 be non-continuous.

The crankshaft 112 includes first and a second axially facing walls 146,148 respectively defining a first and a second end separated by a length 150 of each rod journal 116. Each retaining ring 136 also includes an axial bearing surface 152 thereof, for bearing against one of the first and second axially facing walls 146, 148 of the crankshaft 112.

As shown in FIG. 4*a*, the ends of 154, 156 of the bearing saddle 126 are configured at an acute angle to the longitudinal midplane 124, generally pointing toward the intersection of the radius 132 with the longitudinal midplane 124. As shown in FIG. 6, the ends 154, 156 of the bearing saddle 126 are angled in this manner to provide clearance between the adjacent ends 154, 156 of the bearing saddles 126 of the pair of connecting rods 118 attached to each rod journal 116, as the rod journal 116 traverses the circular path 158 and the connecting rods reciprocate in the common plane 120.

While the embodiments of the invention disclosed herein are presently considered to be preferred, various changes and modifications can be made without departing from the spirit and scope of the invention.

The scope of the invention is indicated in the appended claims, and all changes or modifications within the meaning and range of equivalents are intended to be embraced therein.

What is claimed is:

1. A bilateral connecting rod apparatus comprising:

a crankshaft defining an axis of rotation and a rod journal eccentrically mounted for circular rotation about the axis;

a pair of connecting rods attached to the rod journal for reciprocating motion in a common plane extending perpendicularly through the rod journal, each connecting rod including:

a shank portion defining a longitudinal midplane of the connecting rod, a bearing saddle, the bearing saddle having a cylindrical surface bisected by the longitudinal midplane and subtended by an angle of less than 180 degrees centered at a radius of the cylindrical surface along the longitudinal midplane for engaging the rod journal, and an arcuate surface extending parallel to the cylindrical surface of the bearing saddle, wherein the crankshaft includes a first and a second axially facing wall respectively defining a first and a second end of the rod journal separated by a length of the rod journal;

a retaining ring, the retaining ring engaging the bearing saddles of the connecting rods and having a first bearing surface thereof configured for bearing against the arcuate surface of each connecting rod, a second bearing surface thereof configured for bearing against the rod journal, and an axial bearing surface thereof for bearing against one of the first and second axially facing walls of the crankshaft; and a bearing insert disposed between the cylindrical surfaces of the bearing saddles of the connecting rods and the rod journal.

2. The apparatus of claim 1 wherein the bearing insert is disposed between the rod journal and both the cylindrical surfaces of the bearing saddles of the connecting rods and the second bearing surfaces of the retaining ring.

3. The apparatus of claim 2 wherein the second surface of the retaining ring and the bearing insert extend 360 degrees around the rod journal.

4. The apparatus of claim 3 wherein:

each connecting rod includes a second arcuate surface extending parallel the cylindrical surface of the bearing saddle; and the apparatus includes a second retaining ring having a first bearing surface thereof configured for bearing against the arcuate surface of the connecting rod, a second bearing surface thereof for bearing against the rod journal, and an axial bearing surface thereof for bearing against the other of the first and second axial surfaces of the crankshaft.

5. The apparatus of claim 4 wherein the bearing insert is further disposed between the second surface of the second retaining ring and the rod journal.

6. The apparatus of claim 5 wherein the second surface of the second retaining ring extends 360 degrees around the rod journal.

* * * * *